(12) United States Patent
Larsson et al.

(10) Patent No.: US 11,717,993 B2
(45) Date of Patent: Aug. 8, 2023

(54) METHOD FOR PRODUCING A CELLULOSE PRODUCT

(71) Applicant: PulPac AB, Västra Frölunda (SE)

(72) Inventors: Linus Larsson, Gothenburg (SE); Ove Larsson, Västra Frölunda (SE)

(73) Assignee: PulPac AB, Västra Frölunda (SE)

( * ) Notice: Subject to any disclaimer, the term of this patent is extended or adjusted under 35 U.S.C. 154(b) by 180 days.

(21) Appl. No.: 17/049,842

(22) PCT Filed: Apr. 17, 2019

(86) PCT No.: PCT/SE2019/050357
§ 371 (c)(1),
(2) Date: Oct. 22, 2020

(87) PCT Pub. No.: WO2019/209160
PCT Pub. Date: Oct. 31, 2019

(65) Prior Publication Data
US 2021/0069942 A1    Mar. 11, 2021

(30) Foreign Application Priority Data

Apr. 25, 2018   (SE) .................................. 1850495-1

(51) Int. Cl.
*B29C 43/18*   (2006.01)
*B29C 43/20*   (2006.01)
(Continued)

(52) U.S. Cl.
CPC ............ *B29C 43/203* (2013.01); *B29C 43/18* (2013.01); *B29C 51/004* (2013.01);
(Continued)

(58) Field of Classification Search
CPC ..... B29C 43/203; B29C 43/18; B29C 51/004; B29C 70/06; B29C 70/44; B29C 70/46
(Continued)

(56) References Cited

U.S. PATENT DOCUMENTS

| 4,071,651 | A | * | 1/1978 | Hicklin | .................... D21H 5/26 |
| | | | | | 156/324 |
| 4,100,324 | A | * | 7/1978 | Anderson | ................ D04H 1/56 |
| | | | | | 428/326 |

(Continued)

FOREIGN PATENT DOCUMENTS

| DE | 202007011003 U1 | 10/2007 |
| WO | WO-2017160217 A1 | 9/2017 |

OTHER PUBLICATIONS

Extended European Search Report for European Application No. 19792812.0, dated Dec. 17, 2021.
(Continued)

*Primary Examiner* — Edmund H Lee
(74) *Attorney, Agent, or Firm* — Marshall, Gerstein & Borun LLP

(57) ABSTRACT

A method for producing a cellulose product from a multi-layer cellulose blank structure, wherein the method comprises the steps; forming the multi-layer cellulose blank structure from at least a first layer of dry-formed cellulose fibres and a second layer of a cellulose fibre web structure, through arranging the at least first layer and second layer in a superimposed relationship to each other and in the superimposed relationship arranging the at least first layer and second layer in contact with each other; arranging the multi-layer cellulose blank structure in a forming mould; heating the multi-layer cellulose blank structure to a forming temperature in the range of 100° C. to 300° C., and forming the cellulose product from the multi-layer cellulose blank structure in the forming mould, by pressing the heated multi-layer cellulose blank structure with an isostatic forming pressure of at least 1 MPa, preferably 4-20 MPa, wherein the multi-layer cellulose blank structure is shaped into a (Continued)

two-dimensional or three-dimensional fibre composite structure having a single-layer configuration.

17 Claims, 7 Drawing Sheets

(51) Int. Cl.
*B29C 51/00* (2006.01)
*B29K 1/00* (2006.01)
*B29K 23/00* (2006.01)
*B29K 67/00* (2006.01)
*B29K 77/00* (2006.01)
*B29K 101/12* (2006.01)
*B29K 309/00* (2006.01)

(52) U.S. Cl.
CPC ...... *B29K 2001/08* (2013.01); *B29K 2003/00* (2013.01); *B29K 2023/06* (2013.01); *B29K 2023/12* (2013.01); *B29K 2067/046* (2013.01); *B29K 2077/00* (2013.01); *B29K 2101/12* (2013.01); *B29K 2291/00* (2013.01); *B29K 2309/00* (2013.01)

(58) Field of Classification Search
USPC ......................................................... 264/258
See application file for complete search history.

(56) References Cited

U.S. PATENT DOCUMENTS

| | | | | |
|---|---|---|---|---|
| 4,385,955 A | * | 5/1983 | Doerfling | B60R 13/02 |
| | | | | 264/258 |
| 4,418,031 A | * | 11/1983 | Doerer | D04H 1/558 |
| | | | | 428/326 |
| 4,568,581 A | * | 2/1986 | Peoples, Jr. | D04H 1/5418 |
| | | | | 442/403 |
| 5,227,113 A | * | 7/1993 | Hamabe | B29B 11/16 |
| | | | | 264/258 |
| 5,643,384 A | * | 7/1997 | Okabe | B31F 1/0077 |
| | | | | 156/224 |
| 2010/0190020 A1 | * | 7/2010 | Frederiksen | B29C 43/02 |
| | | | | 162/146 |

OTHER PUBLICATIONS

International Search Report and Written Opinion for Application No. PCT/SE2019/050357, dated Jun. 19, 2019.
Swedish Search Report for Application No. 1850495-1, dated Nov. 19, 2018.

* cited by examiner

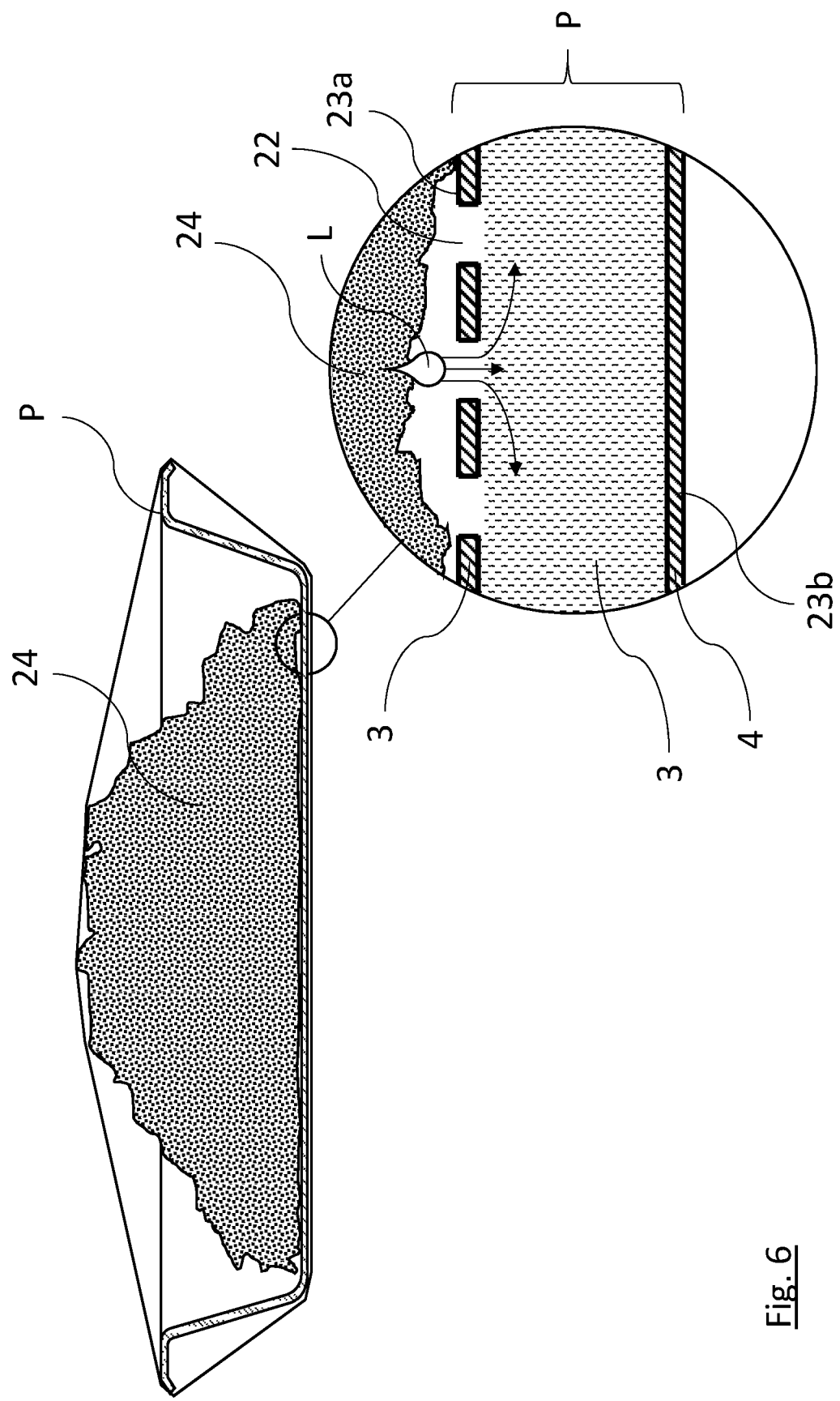

METHOD FOR PRODUCING A CELLULOSE PRODUCT

TECHNICAL FIELD

The present disclosure relates to a method for producing a cellulose product from at least a first layer and a second layer of cellulose fibres.

BACKGROUND

Cellulose fibres are often used as raw material for producing or manufacturing products. Products formed of cellulose fibres can be used in many different situations where there is a need for having sustainable products of flat or essentially non-flat shapes. A flat shape may refer to a generally two-dimensional shape, such as for example the shape of a sheet material or blank, and essentially non-flat shapes may refer to any suitable three-dimensional object shape. There is a wide range of products that can be produced from cellulose fibres and a few examples are disposable plates and cups, blank structures and packaging materials. Packages produced from cellulose fibres may for example be used for packaging of liquids, dry materials and other types of goods, where the packaging may be made in a three-dimensional shape or formed into a three-dimensional shape from a two-dimensional sheet material.

A low price material commonly used for cellulose fibre products is wet moulded pulp. Wet moulded pulp has the advantage of being considered as a sustainable packaging material, since it is produced from biomaterials and can be recycled after use. Consequently, wet moulded pulp has been quickly increasing in popularity for different applications. Wet moulded pulp articles are generally formed by immersing a suction mould into a liquid or semi liquid pulp suspension or slurry, while suction is applied, whereby a body of pulp is formed with the shape of the desired product by fibre deposition. The suction mould is then withdrawn from the suspension and the suction is generally continued to compact the deposited fibres while exhausting residual liquid. With all wet-forming techniques, there is a need for drying of the wet moulded product, where the drying is a very time and energy consuming part of the production. The demands on aesthetical, chemical and mechanical properties of products are increasing, and due to the properties of wet-formed cellulose products, the mechanical strength, flexibility, and chemical properties are limited. It is also difficult in the wet-forming process to control the mechanical properties of the products with high precision. Further, the production of aesthetically attractive wet-formed cellulose products, such as printed or coloured products, is both time consuming and expensive.

There is thus a need for improved sustainable cellulose products where the cellulose products are having improved mechanical and chemical properties, can be manufactured with high precision, and where the production is cost-efficient and rational. There is further a need for cellulose products, where the products are aesthetically attractive with coloured and/or patterned designs, and where the process for manufacturing such coloured and/or patterned products is accomplished with high production speeds in a cost efficient way.

SUMMARY

An object of the present disclosure is to provide a method for producing a cellulose product where the previously mentioned problems are avoided. This object is at least partly achieved by the features of the independent claim. The dependent claims contain further developments of the method for producing a cellulose product.

The disclosure concerns a method for producing a cellulose product from a multi-layer cellulose blank structure, wherein the method comprises the steps; forming the multi-layer cellulose blank structure from at least a first layer of dry-formed cellulose fibres and a second layer of a cellulose fibre web structure, through arranging the at least first layer and second layer in a superimposed relationship to each other and in the superimposed relationship arranging the at least first layer and second layer in contact with each other; arranging the multi-layer cellulose blank structure in a forming mould; heating the multi-layer cellulose blank structure to a forming temperature in the range of 100° C. to 300° C., and forming the cellulose product from the multi-layer cellulose blank structure in the forming mould, by pressing the heated multi-layer cellulose blank structure with an isostatic forming pressure of at least 1 MPa, preferably 4-20 MPa, wherein the multi-layer cellulose blank structure is shaped into a two-dimensional or three-dimensional fibre composite structure having a single-layer configuration.

Advantages with these features are that the method provides an efficient manufacturing process for cellulose products with improved mechanical and chemical properties, where the cellulose products can be manufactured with high precision. The method also provides a cost-efficient and rational production of cellulose products through its few simple steps compared to traditional production methods. Through the use of the multi-layer cellulose blank structure the material properties of the resulting cellulose product can be steered and controlled in a more efficient way compared to using only one layer. For example, the multi-layer cellulose blank structure can enable different properties in the surface of the cellulose product compared to the properties in the core of the cellulose product. The isostatic forming pressure is providing an efficient forming process of the cellulose products in the forming mould, and the cellulose products can through the isostatic forming be produced with high quality even if having complex shapes.

According to other aspects of the disclosure, the first layer has a fibre composition of 100% cellulose fibres, and/or the second layer has a fibre composition of 100% cellulose fibres, or the first layer has a fibre composition of 100% natural cellulose fibres, and/or the second layer has a fibre composition of 100% natural cellulose fibres. With these fibre compositions products suitable for recycling or composting can be produced.

According to an aspect of the disclosure, the first layer of dry-formed cellulose fibres is formed in a dry-forming process where the cellulose fibres are carried and formed to the fibre layer structure by air as carrying medium.

According to another aspect of the disclosure the cellulose product is formed in the forming mould during a forming time period in the range of 0.001 to 20 seconds, preferably 0.01 to 15.0 seconds, more preferably 0.1 to 10.0 seconds. The forming time together with the forming temperature and the forming pressure are important parameters in the forming of the cellulose product.

According to other aspects of the disclosure, the first layer and/or the second layer comprise one or more additives that are altering the mechanical, hydrophobic, and/or oleophobic properties of the cellulose product. Each of the first layer and the second layer has a material composition of 70-99.9% dry wt cellulose fibres and 0.1-30% dry wt of the one or more additives, preferably 80-99.9% dry wt cellulose fibres and 0.1-20% dry wt of the one or more additives, more preferably 90-99.9% dry wt cellulose fibres and 0.1-10% dry wt of the one or more additives. The one or more additives of the first layer and/or the second layer are starch compounds, rosin compounds, butanetetracarboxylic acid, gelatin compounds, alkyl ketene dimer (AKD), Alkenyl Succinic Anhydride (ASA), wax compounds, silicon compounds, calcium compounds, and/or fluorocarbons. By using additives in the first layer and/or the second layer, the properties of the cellulose product can be efficiently steered and controlled. The additives can alter the mechanical, hydrophobic, and/or oleophobic properties so that the cellulose product can be used for different purposes. For example, it can be possible to create a scratch free surface by the use of a starch compound or a calcium compound, such as calcium carbonate, as an additive.

According to other aspects of the disclosure, the one or more additives of the first layer and/or the second layer have been added to the first layer before forming the multi-layer cellulose blank structure. In this way, the additives could be added to the respective layers during the production of the layers, or in a process step before the multi-layer cellulose blank structure is formed.

According to other aspects of the disclosure, the second layer is formed from dry-formed cellulose fibres into the cellulose fibre web structure, from woven cellulose fibres into the cellulose fibre web structure, or from wet-formed cellulose fibres into the cellulose fibre web structure. There are thus several possible options for forming the second layer, and the different options can be used for different types of cellulose products.

According to a further aspect of the disclosure, the second layer is arranged as a carrying layer for the first layer, wherein the second layer has a higher tensile strength than the first layer. This may be useful when the first layer has a composition with a low tensile strength in order to avoid that the first layer will break during the forming of the cellulose product. The carrying layer with a higher tensile strength acts in this way as a supporting structure for the other layer.

According to an aspect of the disclosure, the first layer has a dry basis weight in the range of 50-2000 g/m² and a tensile strength in the range of 0.01-0.5 MPa before forming the multi-layer cellulose blank structure in the forming mould into the cellulose product, and the second layer has a dry basis weight in the range of 10-30 g/m² and a tensile strength in the range of 0.5-4 MPa before forming the multi-layer cellulose blank structure in the forming mould into the cellulose product. The different basis weights and tensile strengths are used for controlling the properties of the cellulose product, which may differ between different types of cellulose products.

According to other aspects of the disclosure, the multi-layer cellulose blank structure further comprises one or more additional layers of cellulose fibres, wherein the multi-layer cellulose blank structure is formed through arranging the layers of cellulose fibres in a superimposed relationship to each other and in the superimposed relationship arranging the layers of cellulose fibres in contact with each other. The one or more additional layers are formed from a woven cellulose fibre structure, a dry-formed cellulose fibre structure, and/or a wet-formed cellulose fibre structure. The additional layers are used for further controlling the properties of the cellulose products. By using a number of different layers the properties of the cellulose product can be varied in many different ways, depending on the compositions of the respective layers.

According to further aspects of the disclosure, at least one of the one or more additional layers of the multi-layer cellulose blank structure comprises 2-5% dry wt of thermoplastic reinforcing mono-component fibres having a melting temperature below the forming temperature, and/or at least one of the one or more additional layers of the multi-layer cellulose blank structure comprises 2-5% dry wt of thermoplastic reinforcing bi-component fibres. The thermoplastic reinforcing bi-component fibres are having an outer sheath and an inner core, wherein the melting temperature of the outer sheath is below the forming temperature, and the melting temperature of the inner core is above the forming temperature. The mix of cellulose fibres with thermoplastic fibres may be used to even further vary or alter the properties of the cellulose product. The surface properties or the core properties of the resulting composite structure having the single-layer configuration forming the cellulose product can be controlled and varied depending on how the at least one additional layer containing thermoplastic fibres is positioned in relation to the first layer, the second layer and possible other additional layer or layers.

According to other aspects of the disclosure, one or more additives that are altering the mechanical, hydrophobic, and/or oleophobic properties of the cellulose product are added to the formed multi-layer cellulose blank structure. The formed multi-layer cellulose blank structure comprises 70-99.9% dry wt cellulose fibres and 0.1-30% dry wt of the one or more additives preferably 80-99.9% dry wt cellulose fibres and 0.1-20% dry wt of the one or more additives, more preferably 90-99.9% dry wt cellulose fibres and 0.1-10% dry wt of the one or more additives. The one or more additives of the formed multi-layer cellulose blank structure are starch compounds, rosin compounds, butanetetracarboxylic acid, gelatin compounds, alkyl ketene dimer (AKD), Alkenyl Succinic Anhydride (ASA), wax compounds, silicon compounds, calcium compounds, and/or fluorocarbons. This provides an alternative way to add additives to the layered structure, and the additive can be added after the forming of the multi-layer cellulose blank structure, before the forming in the forming mould.

According to an aspect of the disclosure, the multi-layer cellulose blank structure is heated in the forming mould. This provides an efficient heating of the multi-layer cellulose blank structure.

According to another aspect of the disclosure, the cellulose product is shaped into a three-dimensional structure from the multi-layer cellulose blank structure during the forming in the forming mould. During the forming of the cellulose product in the forming mould, the cellulose product will achieve its three-dimensional shape.

According to other aspects of the disclosure, the multi-layer cellulose blank structure is arranged as a layered continuous web comprising the layers of cellulose fibres, and the multi-layer continuous web is formed from the layers in a continuous process step. This provides an efficient manufacturing process of the cellulose products.

According to an aspect of the disclosure, the multi-layer cellulose blank structure is arranged as discrete pieces of material comprising the layers of cellulose fibres. This method can be used as an alternative for specific product purposes if desired, such as for example absorbent structures for blood absorption in meat trays.

According to an aspect of the disclosure, at least one of the layers of the multi-layer cellulose blank structure is a pre-printed or coloured layer. The pre-printing or colouring is for example used for branding and/or content descriptions, eliminating the need for additional labels, or for achieving an attractive appearance of the cellulose product. The layer or layers may be coloured through any suitable conventional colouring method, and graphical figures or patterns may be printed on the layer or layers so that the cellulose product will have an aesthetically appealing design. The cellulose product can for example be coloured by using a pre-coloured tissue as an outer layer.

According to an aspect of the disclosure, the method further comprises the steps; arranging a barrier layer in contact with the multi-layer cellulose blank structure, and forming the multi-layer cellulose blank structure and the barrier layer in the forming mould, wherein during forming the barrier layer is adhered to the two-dimensional or three-dimensional fibre composite structure. The barrier layer can for example be made of a suitable polymer film, such as a thermoplastic film, or similar structure that is acting as a barrier for liquids and/or gases and that is adhering to the multi-layer cellulose blank structure to a certain extent during the forming of the cellulose product in the forming mould. Such a non-cellulose film may for example be removed by an end-user after usage before recycling of or composting the cellulose product.

According to another aspect of the disclosure, the barrier layer is a polyethylene (PE) film, polyamide (PA) film, polypropylene (PP) film, polylactic acid (PLA) film, coated aluminium structure, cellulose structure laminated with a thermoplastic material, cellulose structure coated with wax, or cellulose structure coated with silicon.

According to a further aspect of the disclosure, the barrier layer is biodegradable.

BRIEF DESCRIPTION OF DRAWINGS

The disclosure will be described in greater detail in the following, with reference to the attached drawings, in which FIG. 6 shows schematically, a cellulose product with an absorbing layer according to the disclosure.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

In the present detailed description, a method for producing a cellulose product from a multi-layer cellulose blank structure will be described.

Embodiments of sheet materials or blanks according to the disclosure are mainly discussed with reference to a multi-layer cellulose blank structure placed in position for forming in a forming mould, where the multi-layer cellulose blank structure has a flat shape. It should be noted that this will not limit the scope of the present disclosure, which for example may include, a multi-layer cellulose blank structure pre-shaped into a three-dimensional shape. The multi-layer cellulose blank structure may be presented to the forming mould in a shape similar to the desired final shape of the object if desired.

A flat shape may refer to a generally two-dimensional shape, such as for example the shape of a blank or a sheet material, and essentially non-flat shapes may refer to any suitable three-dimensional shape. A cellulose product according to the disclosure may be made in a two-dimensional shape, a three-dimensional shape, or formed into a three-dimensional shape from a two-dimensional blank or sheet material. The cellulose product may have complex shapes with different thicknesses, non-hollow portions or massive structures. For instance, the cellulose product can advantageously comprise stiffeners, creases, holes, shaped text, hinges, locks, threads, snaps, feet, handles or surface patterns.

The multi-layer cellulose blank structure according to the disclosure is formed from at least a first layer of dry-formed cellulose fibres and a second layer of a cellulose fibre web structure. The expression multi-layer cellulose blank structure is referring to a blank structure that is formed of two or more layers containing cellulose fibres, where the layers may have the same or different compositions or configurations.

Figure 1:
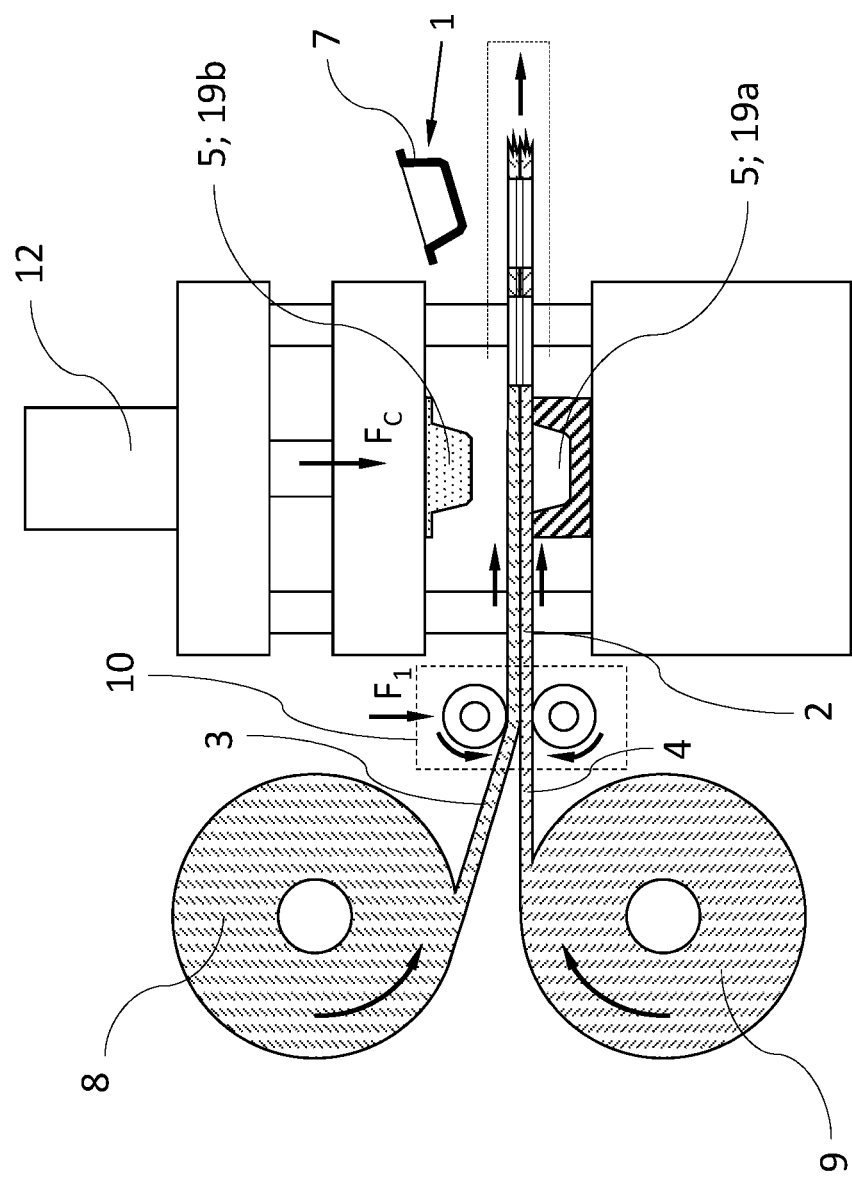
FIG. 1 shows schematically, a method for producing a cellulose product from a multi-layer cellulose blank structure in a two-layer configuration according to the disclosure.

FIG. 1 schematically shows a method for producing a cellulose product 1 from a multi-layer cellulose blank structure 2, where the multi-layer cellulose blank structure 2 has a two-layer configuration. In the embodiment shown in FIG. 1, the multi-layer cellulose blank structure 2 is formed from a first layer 3 of dry-formed cellulose fibres and a second layer 4 of a cellulose fibre web structure.

The first layer 3 of dry-formed cellulose fibres and a second layer 4 of a cellulose fibre web structure are suitably compostable or biodegradable.

With a layer of dry-formed cellulose fibres is meant a cellulose fibre layer that is formed in a dry-forming process in which cellulose fibres are air-laid to form the cellulose fibre layer. When forming the cellulose fibre layer in the air-laid process, the cellulose fibres are carried and formed to the fibre layer structure by air as carrying medium. This is different from a normal papermaking process or a traditional wet-forming process, where water is used as carrying medium for the cellulose fibres when forming the paper of fibre structure. In the air-laid process, small amounts of water or other substances may if desired be added to the cellulose fibres in order to change the properties of the cellulose product, but air is still used as carrying medium in the forming process. The layer of dry-formed cellulose fibres may have a dryness that is mainly corresponding to the ambient humidity in the atmosphere surrounding the layer of dry-formed cellulose fibres.

The layer of dry-formed cellulose fibres according to an embodiment of the disclosure has a fibre composition of 100% cellulose fibres, wherein the layer is built-up from a fibre composition only containing cellulose fibres. In this embodiment the layer of dry-formed cellulose fibres is having a fibre structure with fibres from only cellulosic structures. The layer of dry-formed cellulose fibres is thus free from thermoplastic fibres or other fibres that may negatively impact the formation of hydrogen bonds between the cellulose fibres during forming of the cellulose products.

As described above, other substances may be added for changing the properties of the layer, such as suitable additives and water. With cellulose fibres is meant any type of cellulose fibres, such as natural cellulose fibres or manufactured cellulose fibres.

With a layer of a cellulose fibre web structure is meant a web structure produced from cellulose fibres. The cellulose fibre web structure may for example be a dry-formed cellulose fibre structure identical or similar to the dry-formed cellulose fibre layer described above or alternatively a wet-laid cellulose fibre structure that has been dried by conventional drying techniques into the cellulose fibre web structure. The cellulose fibre web structure can have a dryness that is mainly corresponding to the ambient humidity in the atmosphere surrounding the cellulose fibre web structure, or alternatively the cellulose fibre web structure can be wetted before the forming of the cellulose product in the forming mould.

The layer of cellulose fibre web structure may according to one embodiment of the disclosure have a fibre composition of 100% cellulose fibres, wherein the layer is built-up from a fibre composition only containing cellulose fibres. In this embodiment the layer of cellulose fibre web structure is having a fibre structure with fibres from only cellulosic structures. The layer of cellulose fibre web structure is in this embodiment thus free from thermoplastic fibres or other fibres that may negatively impact the formation of hydrogen bonds between the cellulose fibres during forming of the cellulose products. As described above, other substances may be added for changing the properties of the layer, such as suitable additives and water. With cellulose fibres is meant any type of cellulose fibres, such as natural cellulose fibres or manufactured cellulose fibres.

In the forming of the multi-layer cellulose blank structure, the at least first layer and second layer are arranged in a superimposed relationship to each other. In the superimposed relationship the at least first layer and second layer are arranged in contact with each other so that the multi-layer cellulose blank structure is formed. In the superimposed relationship, the layers are arranged on top of each other so that the layers are in contact. The order of the different layers in the multi-layer cellulose blank structure may be altered depending on the desired properties of the resulting cellulose product.

To produce the cellulose products, the multi-layer cellulose blank structure may be arranged as a layered continuous web comprising the layers of cellulose fibres. The multi-layer continuous web may be formed from the layers in a continuous process step, where the continuous web is fed to the forming mould to form the cellulose products. As an alternative, the multi-layer cellulose blank structure may instead be arranged as discrete pieces of material comprising the layers of cellulose fibres, and the discrete pieces of material are fed to the forming mould for forming the cellulose products.

In the embodiment shown in FIG. 1, the first layer 3 of the dry-formed cellulose fibres is arranged in a prefabricated web structure wound in a first roll 8, and the second layer 4 of the cellulose fibre web structure is also a prefabricated web structure wound in a second roll 9. The first layer 3 and the second layer 4 are in the method unwound from the respective rolls 8, 9, and arranged in the superimposed relationship to each other. As shown in FIG. 1, a pair of pressure feed rollers 10 are used for both compacting and unwinding the first layer 3 and the second layer 4, so that the first layer 3 and the second layer 4 are arranged in contact with each other. In this embodiment the first layer 3 is arranged above the second layer 4, but the layers may suitably be arranged in the opposite order. The pair of pressure feed rollers 10 may be arranged so that the rollers are pushed against each other with a force $F_1$, and when the layers are passing between the pair of pressure feed rollers 10, the layers are compacted and forming the multi-layer cellulose blank structure 2. The force $F_1$ may be chosen so that a desired compacting of the layers is achieved. Other suitable means may be used instead of the pair of pressure feed rollers 10, such as for example motorized unwinders for the web rolls.

As a non-limiting example, in order to achieve a desired compacting of the layers, the force $F_1$ of the pair of pressure feed rollers 10 may be in the range 2000 N to 17000 N, and the multi-layer cellulose blank structure may have a width of 0.35 m. The pair of pressure feed rollers 10 may be heated, for example to a temperature in the range of 70° C. to 170° C., so that the layers are heated during the compression in the pair of pressure feed rollers 10. The heating of the layers during compression will form a compressed ductile web structure that is suitable for being transported to and formed in the forming mould.

Further according to the method, the multi-layer cellulose blank structure is arranged in the forming mould. The multi-layer cellulose blank structure may be arranged in the forming mould in any suitable way, and as an example, the multi-layer cellulose blank structure may be manually fed to and arranged in the forming mould.

Another alternative is, as shown in FIG. 1, to arrange a feeding device for the multi-layer cellulose blank structure 2, which is transporting the multi-layer cellulose blank structure 2 to the forming mould 5. The forming mould 5 may be arranged in a suitable forming mould unit 12 comprising high pressure tools and other necessary pressing equipment. In the embodiment illustrated in FIG. 1, the pair of pressure feed rollers 10 may be used for compacting and transporting the multi-layer cellulose blank structure 2 to the forming mould 5. The feeding device may alternatively be a conveyor belt, an industrial robot, or any other suitable manufacturing equipment. The forming of the cellulose product 1 from the multi-layer cellulose blank structure 2 in the embodiment shown in FIG. 1 may be an intermittent or a continuous manufacturing process in which the cellulose product 1 is produced. The multi-layer cellulose blank structure 2 is in the process fed to the forming mould 5 with the pair of pressure feed rollers 10. If the cellulose product 1 is formed in an intermittent process, the pair of pressure feed rollers 10 may intermittently feed the multi-layer cellulose blank structure 2 to the forming mould 5, where the pair of pressure feed rollers 10 is stopped during the forming of the cellulose product 1 in the forming mould 5. If the cellulose product instead is formed in a continuous process, the forming mould 5 may be arranged as a moving forming mould 5, where the movement of the forming mould 5 may be reciprocating and synchronized with the feeding of the multi-layer cellulose blank structure 2. This is enabling constant speed of the multi-layer cellulose blank structure 2 through the production process. In this way, the forming mould 5 may be arranged so that it moves with the multi-layer cellulose blank structure 2 and in the feeding direction of the multi-layer cellulose blank structure 2 during forming of the cellulose product 1.

The multi-layer cellulose blank structure could as an alternative be intermittently fed to the forming mould by a suitable feeding unit if the multi-layer cellulose blank structure is arranged as a continuous web transported with a constant speed, and the forming of the cellulose products in the forming mould may take place in intermittent process steps. The multi-layer cellulose blank structure may for example be intermittently fed to the forming mould via a feeding unit in the form of a buffer zone arrangement, where a pivot roller arm with a lift roller lifts and bends the multi-layer cellulose blank structure in a gentle arc with a synchronized servo controlled movement. In this way, a suitable length of the multi-layer cellulose blank structure is buffered to enable on-demand incremental feeding of the multi-layer cellulose blank structure into the forming mould. When the pivot roller arm is lowered, the buffered multi-layer cellulose blank structure can be fed intermittently to the forming mould. The pivot roller arm is thus lifted and lowered in a repeated manner to accomplish the buffering of the multi-layer cellulose blank structure, so that the multi-layer cellulose blank structure is intermittently fed to the forming mould, via for example feeding rollers arranged after the pivot roller arm.

The multi-layer cellulose blank structure is according to the disclosure further heated to a forming temperature in the range of 100° C. to 300° C. The cellulose product is formed from the multi-layer cellulose blank structure in the forming mould by pressing the heated multi-layer cellulose blank structure with an isostatic forming pressure of at least 1 MPa, preferably 4-20 MPa. By heating the multi-layer cellulose blank structure and pressing the multi-layer cellulose blank structure in the forming mould, the cellulose product is formed, where during the forming the multi-layer cellulose blank structure is shaped into a two-dimensional or three-dimensional fibre composite structure having a single-layer configuration.

In the embodiment shown in FIG. 1, the multi-layer cellulose blank structure 2 is heated and formed into the cellulose product 1, where the cellulose product 1 is having a three-dimensional bowl-shaped product configuration. However, as described above, the cellulose product 1 may have any desired two-dimensional or three-dimensional shape. The first layer 3 and the second layer 4 are unwound from the first roll 8 and the second roll 9 respectively, and compressed by the pair of pressure feed rollers 10. When the first layer 3 and the second layer 4 are arranged in a superimposed relationship to each other and arranged in contact with each other, the multi-layer cellulose blank structure 2 is formed. The formed cellulose product 1 is shaped into a two-dimensional or three-dimensional fibre composite structure 7 having a single-layer configuration in the forming mould 5. In the embodiment shown in FIG. 1, the multi-layer cellulose blank structure 2 has a two-layer configuration formed of the first layer 3 of dry-formed cellulose fibres and the second layer 4 of cellulose fibre web structure. The pair of pressure feed rollers 10 is transporting the multi-layer cellulose blank structure 2 to the forming mould 5.

In order to form the cellulose product, the multi-layer cellulose blank structure 2 is positioned in the forming mould 5, where the multi-layer cellulose blank structure 2 is heated to a forming temperature in the range of 100° C. to 300° C. and then pressed in the forming mould 3 with an isostatic forming pressure of at least 1 MPa, preferably 4-20 MPa. The heating and pressing of the multi-layer cellulose blank structure 2 in the forming mould 5 will be further described below. The heating of the multi-layer cellulose blank structure 2 may take place before arranging the multi-layer cellulose blank structure 2 in the forming mould 5 or at least partly before the pressing in the forming mould 5. This may for example be accomplished through arranging a suitable heating unit in the manufacturing process. As an alternative, the heating of the multi-layer cellulose blank structure 2 may take place in the forming mould 5 when being pressed. The heating of the multi-layer cellulose blank structure 2 may for example be accomplished through heating the forming mould 5 before pressing the multi-layer cellulose blank structure 2. The pressure may also be applied before heating the multi-layer cellulose blank structure 2, and for example the heating of the multi-layer cellulose blank structure 2 may take place in the forming mould 5 during pressing.

When pressing the cellulose fibres with the isostatic forming pressure of at least 1 MPa, preferably 4-20 MPa, with a forming temperature in the range of 100° C. to 300° C., the cellulose fibres will be bonded to each other in a way so that the resulting cellulose product will have good mechanical properties. Tests have shown that higher forming temperatures will give stronger bonding between the cellulose fibres when being pressed at a specific forming pressure. With forming temperatures above 100° C. together with an isostatic forming pressure of at least 1 MPa, preferably 4-20 MPa, the cellulose fibres will be strongly bonded to each other with hydrogen bonds. A higher forming temperature will increase the fibril aggregation, water resistance, Young's modulus and the mechanical properties of the final cellulose product. The high pressure levels are important for fibril aggregation between the cellulose fibres in the cellulose product. At temperatures higher than 300° C., the cellulose fibres will be thermally degraded and therefore temperatures above 300° C. should be avoided. The forming pressure and the forming temperature may be chosen to be suitable for the specific cellulose product to be produced.

Tests have shown that when forming the cellulose product suitable pressure levels are, in the range of 1-100 MPa, and suitable temperature levels are in the range of 100° C. to 300° C. However, pressure levels in the range of 4-20 MPa, and temperature levels in the range of 140° C. to 200° C. are often sufficient in order to achieve cellulose products with desired properties. Cotton fibres can, as an example withstand higher temperatures than some other types of cellulose fibres.

With isostatic forming pressure levels in the range 4-20 MPa, an efficient forming of the cellulose products is achieved, where strong hydrogen bonds are formed between the cellulose fibres in the multi-layer cellulose blank structure 2. Isostatic forming pressure levels below 4 MPa may result in products or parts of products having non-sufficient stiffness. Isostatic forming pressure levels above 20 MPa may result in unnecessarily high investment costs for pressing equipment. Within the pressure level range 4-20 MPa and with suitable forming temperatures in the range 100-300° C., the hydrogen bonds between the cellulose fibres are formed with very short forming time periods, as will be further described below. Tests have shown that suitable forming time periods may be as low as 0.001 seconds, preferably 0.01 seconds and more preferably 0.1 seconds. Longer forming time periods may be used if suitable for the forming of a specific product design, and in very specific cases forming time periods up to 20 seconds may be used.

According to the disclosure, the cellulose product 1 may be formed in the forming mould 5 during a forming time period in the range of 0.001 to 20 seconds. As an alternative, the forming time period may be 0.01 to 15.0 seconds or 0.1 to 10.0 seconds. The time period is chosen so that the desired properties of the cellulose products are achieved and longer forming time periods can be needed if the multi-layer cellulose blank structure 2 is heated in the forming mould 5. During the development of a new cellulose product, it might be necessary to manufacture prototypes with different forming time periods in order to establish which forming time period is the most suitable.

By holding a specific pressure at a specific temperature for a certain period of time, the fibril aggregation in the cellulose fibres will form the fibre composite structure 7 with the single-layer configuration, where the fibre composite structure 7 may have mechanical properties similar to thermoplastic materials that is enabling replacement of thermoplastic materials. If as a non-limiting example, the pressure is 4 MPa, the forming temperature is 150° C., and the forming time period is 5 seconds, a fibre composite structure 7 with mechanical properties close to thermoplastic materials can be achieved. The forming time period may as described above for example range from 0.001 seconds to several seconds, depending on the forming temperature of the multi-layer cellulose blank structure 2 and the pressure applied.

With a single-layer configuration is meant that after the heating and pressing of the multi-layer cellulose blank structure 2, the resulting fibre composite structure 7 forming the cellulose product 1 has been compressed into a single-layered structure, even if being built up of the at least first layer 3 of dry-formed cellulose fibres and the second layer 4 of cellulose fibre web structure. The resulting fibre composite structure 7 thus may appear to be of a single-layer configuration even if built up of the two or more layers. In the single-layer configuration there might be a variation or gradient of different fibres or other substances in different parts of the fibre composite structure 7, which depend on the configuration of each of the at least first layer 3 and the second layer 4, and also on the number of layers used for building up the multi-layer cellulose blank structure 2 and the configuration of each such layer.

By having at least the first layer and the second layer in the multi-layer cellulose blank structure, the mechanical and chemical properties of the multi-layer cellulose blank structure can be efficiently controlled in the manufacturing process of the cellulose products. The at least first layer and second layer can be made with different types of cellulose fibres having different properties, and also the thicknesses and densities of the at least first layer and second layer may vary. In this way, the resulting product properties can be varied depending on the properties of the at least first layer and second layer. As will be further described below, the number of layers in the multi-layer cellulose blank structure may be varied as long as the at least first layer and second layer are part of the multi-layer cellulose blank structure.

By heating and pressing the multi-layer cellulose blank structure, cellulose products with good material properties are achieved. The cellulose products may for example be bottles, containers or a part of containers, where the cellulose products manufactured according to the method may replace plastic products that are more difficult to recycle, or replace wet-formed products with limited material properties. Other cellulose products manufactured according to the method may for example be packages, inserts for packages, hangers, boxes, bowls, plates, cups, trays, or covers.

The forming mould may be of any suitable design and construction. The forming mould may be constructed so that an isostatic pressure is applied when forming the cellulose product in order to compress the cellulose fibres evenly regardless of their relative position in the forming mould and regardless of the actual local amount of fibres in the forming mould. The forming mould may be constructed so that the multi-layer cellulose blank structure is heated in the forming mould. The cellulose product is shaped into a two-dimensional or three-dimensional structure from the multi-layer cellulose blank structure during the forming in the forming mould.

Figure 4A:
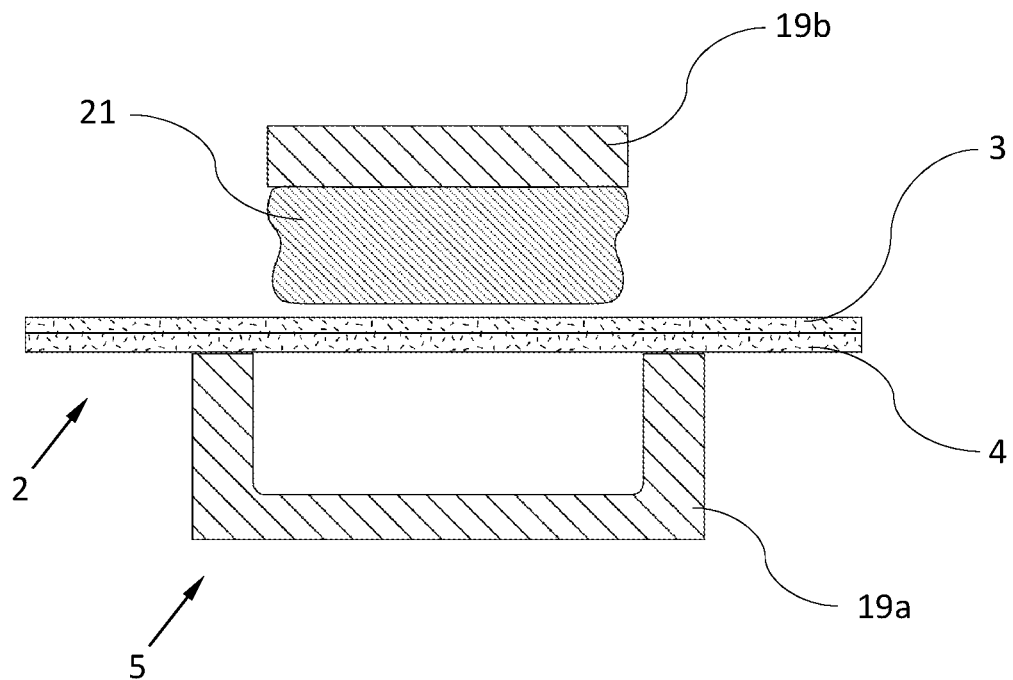
FIG. 4a-c show schematically, a forming mould for forming a cellulose product from a multi-layer cellulose blank structure according to the disclosure.
Figure 4B:
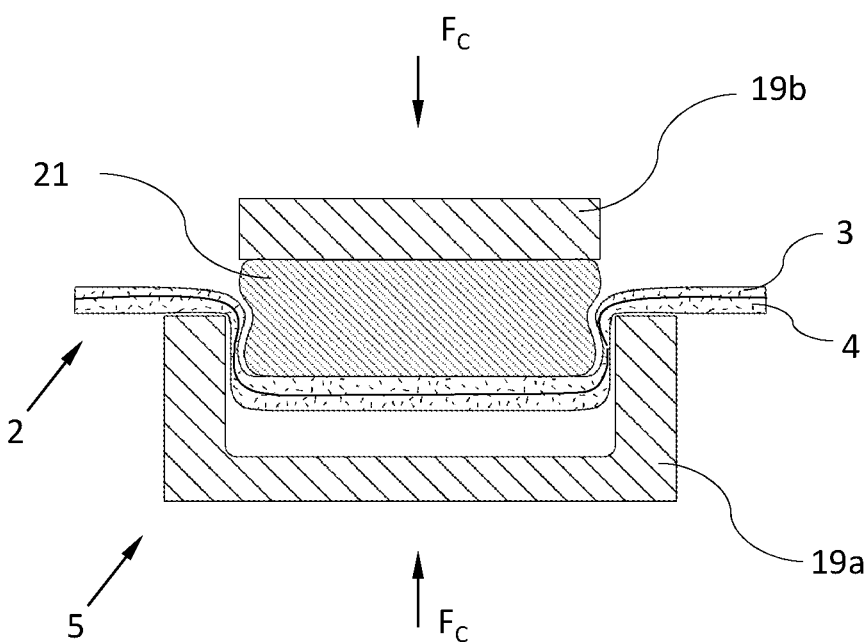
Figure 4C:
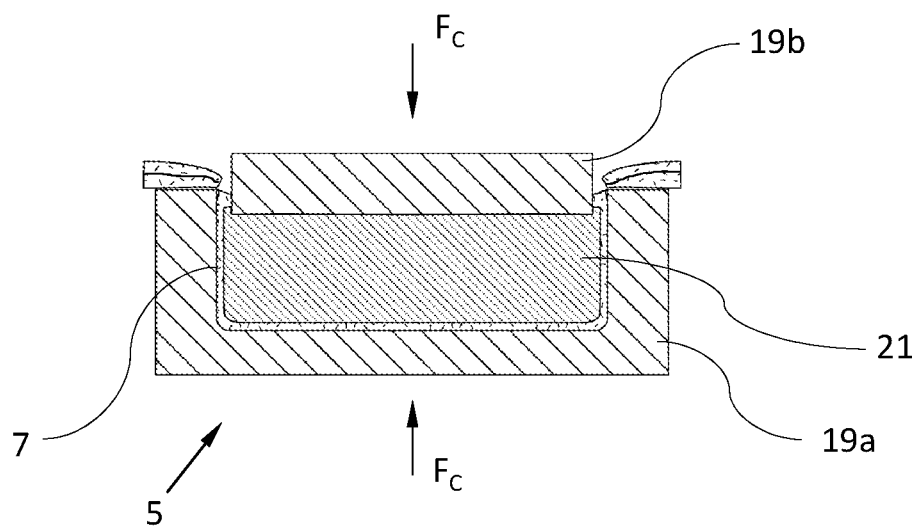

An example embodiment of a forming mould 5 is schematically shown in FIGS. 4a-c, where the forming mould comprises a lower mould part 19a, an upper mould part 19b, and a deformation element 21 connected to the lower mould part 19a or the upper mould part 19b. In FIG. 4a, a schematic side view of the forming mould 5 is shown in an open state. The lower mould part 19a and the upper mould part 19b may be pre-heated mould parts that are surrounding the multi-layer cellulose blank 2 during the forming of the cellulose product 1 in the forming mould 5. During the forming operation, the mould parts are pressed together with a compression force Fc, as indicated with arrows in FIGS. 4b-c, where the deformation element 21 is exerting an isostatic forming pressure on the multi-layer cellulose blank structure 2 during the forming of the cellulose products 1.

FIG. 4a schematically shows the forming mould 5 in an initial open state with the multi-layer cellulose blank 2 in a flat non-compressed state arranged between the lower mould part 19a and the upper mould part 19b. In this embodiment, the deformation element is attached to the upper mould part 19a.

FIG. 4c schematically shows the forming mould 5 in a closed state with the multi-layer cellulose blank 2 in a compressed non-flat state. FIG. 4b schematically shows the forming mould in a state in-between the open and the closed states, where the multi-layer cellulose blank 2 is in a partly compressed non-flat state.

As shown in FIG. 4b the multi-layer cellulose blank structure is deformed during the forming operation by the lower mould part 19a, the upper mould part 19b, and the deformation element 21, and the thickness of the multi-layer cellulose blank 2 may vary due to friction and deformation restrains in the multi-layer cellulose blank 2.

In order to form the cellulose product from the multi-layer cellulose blank 2, the multi-layer cellulose blank 2, has to be heated to the forming temperature, which may be in the range of 100° C. to 300° C. The forming mould parts may be heated to a desired temperature so that heat is transferred to the multi-layer cellulose blank 2 in order to achieve the forming temperature of the multi-layer cellulose blank 2. The forming mould 5 may for example be pre-heated by pumping heated oil into internal channels of the forming mould parts. An alternative way to pre-heat the forming mould 5 is to use integrated electrical resistors. The multi-layer cellulose blank 2 can also be pre-heated, for example by using infrared radiation prior to the forming of the multi-layer cellulose blank 2 in the forming mould 5.

Certain elastic or deformable materials have fluid-like properties when being exposed to high pressure levels. If the deformation element 21 is made of such a material, an even pressure distribution in the forming mould 5 can be achieved in the forming process, where the pressure exerted on the multi-layer cellulose blank structure 2 from the deformation element 21 is equal or essentially equal in all directions in the forming mould 5. When the deformation element 21 is compressed into a fluid-like state, a uniform fluid-like pressure distribution is achieved in the forming mould 5. The forming pressure is with such a material thus applied to the multi-layer cellulose blank structure 2 from all directions, and the deformation element 21 is in this way during the forming of the cellulose products 1 exerting the isostatic forming pressure on the multi-layer cellulose blank structure 2. The isostatic forming pressure from the deformation element 21 is establishing a uniform pressure in all directions in the forming mould 5 on the multi-layer cellulose blank structure 2. The isostatic forming pressure is providing an efficient forming process of the cellulose products 1 in the forming mould 5, and the cellulose products 1 can be produced with high quality even if having complex shapes.

The deformation element 21 may be made of a suitable structure of elastomeric material, where the material has the ability to establish a uniform pressure on the multi-layer cellulose blank structure 2 in the forming mould 5 during the forming process. As an example, the deformation element 21 is made of a massive structure or an essentially massive structure of silicone rubber, polyurethane, polychloroprene, or rubber with a hardness in the range 20-90 Shore A. Other materials for the deformation element 21 may for example be suitable gel materials, liquid crystal elastomers, and MR fluids.

As described above, the deformation element 21 is through deformation during forming of the cellulose products 1 establishing a uniform pressure in all directions in the forming mould 4 on the cellulose blank 3 multi-layer cellulose blank structure 2. The deformation element 21 is during forming of the cellulose products 1 exerting the isostatic forming pressure on the multi-layer cellulose blank structure 2. As described above, suitable isostatic forming pressure levels when forming the cellulose products 1 are within the range 1-100 MPa, preferably 4-20 MPa.

In an alternative embodiment, not shown in the figures, the forming mould 5 may comprise one stiff forming mould part and one flexible forming mould part. The stiff forming mould part may be pre-heated as described in relation to the embodiment above. The use of the flexible forming mould part may provide an isostatic compressing method resulting in a homogeneous cellulose product 1 with high strength and short production cycle time. The flexible forming mould part may be a massive structure or a flexible membrane structure, which is applying an isostatic pressure on the multi-layer cellulose blank structure 2 when forming the cellulose product 1. With flexible forming mould part is meant a flexible structure which has an ability to apply the isostatic pressure to the multi-layer cellulose blank structure 2. The flexible forming mould part may be constructed with a thick membrane structure or even be made of a homogenous body of a flexible material. The flexible material may have properties that will make the material float out between the forming mould parts when the forming pressure is applied to the body. A membrane structure may alternatively be used, where a fluid is used as pressure media to exert the forming pressure on the flexible membrane structure. The multi-layer cellulose blank structure 2 is in this embodiment arranged in the forming mould 5 between the stiff forming mould part and the flexible membrane structure. The membrane structure constitutes a seal for the pressure media or fluid, such as for example hydraulic oil, and the membrane structure can for example be made of rubber, silicone, elastomer or polyurethane.

In an alternative embodiment, not shown in the figures, the multi-layer cellulose blank structure 2 may be cut by the forming mould 5 from residual material when the forming mould 5 is closed. One or both forming mould parts may be provided with a cutting device, such as for example a sharp cutting edge, for cutting the cellulose product 1 free of unwanted residual compressed or un-compressed cellulose fibres in the same pressing motion as when forming the cellulose product in the forming mould 5. This cutting device may be designed to fit a specific thickness of the cellulose product 1. The cutting device may cut the edge of the formed cellulose product in both two-dimensional and three-dimensional shapes depending on the desired shape of the cellulose product 1. The cutting device may be constructed in different ways to be efficient for cutting the final product, for example a narrow incision arranged on one of the forming mould parts interacting with a protruding cutting edge on the other forming mould part, or a cutting edge arranged on one of the forming mould parts interacting with a cutting surface on the other forming mould part. As an alternative, the cutting device may be arranged as a movable cutter integrated in the mould, which is moving in a direction relative to the pressing motion. Any residual cellulose fibers, not used in the cellulose product, may be collected and recycled.

The first layer 3 of dry-formed cellulose fibres may be formed of cellulose fibres in a conventional dry-forming process and be configured in different ways. For example, the first layer 3 of dry-formed cellulose fibres may have the same fibre origin or alternatively contain a mix of two or more types of cellulose fibres, depending on the desired properties of the cellulose product 1. It should be noted that fibres used in the first layer 3 of dry-formed cellulose fibres are only cellulose fibres, however the cellulose fibres may be mixed with other substances or compounds to a certain amount as will be further described below. With cellulose fibres is meant any type of cellulose fibres, such as natural cellulose fibres or manufactured cellulose fibres.

The first layer 3 of dry-formed cellulose fibres may comprise one or more additives that are altering the mechanical, hydrophobic, and/or oleophobic properties of the cellulose product 1. Tests have shown that if the first layer 3 of dry-formed cellulose fibres contains at least 70% of cellulose fibres desired mechanical properties of the cellulose product 1 can be achieved. In order to achieve the desired properties of the formed cellulose product 1, the cellulose fibres should be strongly bonded to each other through fibril aggregation in a way so that the resulting cellulose product 1 will have good mechanical properties. The additives used may therefore not impact the bonding of the cellulose fibres during the forming process to a high extent. As one example, thermoplastic fibres are not added in the first layer 3 of dry-formed cellulose fibres, since they will melt and impact the bonding of the cellulose fibres.

As described above, the layer of dry-formed cellulose fibres 3 according to an embodiment of the disclosure has a fibre composition of 100% cellulose fibres, wherein the layer is built-up from a fibre structure only containing fibres from cellulosic structures. The layer of dry-formed cellulose fibres is thus free from thermoplastic fibres or other fibres that may negatively impact the formation of hydrogen bonds between the cellulose fibres during forming of the cellulose products.

According to one embodiment, the first layer 3 may have a material composition of 70-99.9% dry wt cellulose fibres and 0.1-30% dry wt of the one or more additives. In another embodiment, the first layer 3 may have a material composition of 80-99.9% dry wt cellulose fibres and 0.1-20% dry wt of the one or more additives. In a further embodiment, the first layer 3 may have a material composition of 90-99.9% dry wt cellulose fibres and 0.1-10% dry wt of the one or more additives. Depending on the amount of cellulose fibres and additives used in the first layer 3, the cellulose product 1 can have different properties.

The one or more additives of the first layer 3 can for example be starch compounds, rosin compounds, butanetetracarboxylic acid, gelatin compounds, alkyl ketene dimer (AKD), Alkenyl Succinic Anhydride (ASA), wax compounds, silicon compounds, calcium compounds, and/or fluorocarbons. These additives are commonly used in the forming of cellulose products and are therefore not described in detail. Starch compounds, gelatin compounds, butanetetracarboxylic acid, calcium compounds, and fluorocarbons may for example be used for altering the mechanical properties, such as strength or stiffness, of the cellulose product. Rosin compounds, alkyl ketene dimer (AKD), Alkenyl Succinic Anhydride (ASA), wax compounds, silicon compounds, and fluorocarbons may for example be used for altering the hydrophobic properties of the cellulose product. Fluorocarbons may for example be used also for altering the oleophobic properties of the cellulose product. The one or more additives of the first layer 3 may be added to the first layer 3 before forming the multi-layer cellulose blank structure 2, for example when dry-forming the first layer 3.

The second layer 4 of cellulose fibre web structure may be formed of cellulose fibres in a conventional dry-forming process or alternatively in a conventional wet-forming process with a drying step to achieve a dry structure. The web structure has a dryness that is mainly corresponding to the ambient humidity in the atmosphere surrounding the cellulose fibre web structure, or is alternatively wetted before forming of the cellulose product in the forming mould 5. As described above, the cellulose fibre web structure may for example be a dry-formed cellulose fibre structure identical or similar to the dry-formed cellulose fibre layer described above or alternatively a wet-laid cellulose fibre structure that has been dried by conventional drying techniques into the cellulose fibre web structure. The second layer 4 may be configured in different ways. For example, the second layer 4 of cellulose fibre web structure may have the same fibre origin or alternatively contain a mix of two or more types of cellulose fibres, depending on the desired properties of the cellulose product 1. It should be noted that fibres used in the second layer 4 of cellulose fibre web structure may only be cellulose fibres, however the cellulose fibres may be mixed with other substances or compounds to a certain amount as will be further described below. With cellulose fibres is meant any type of cellulose fibres, such as natural cellulose fibres or manufactured cellulose fibres.

The layer of cellulose fibre web structure 4 may, as described above, according to one embodiment of the disclosure have a fibre composition of 100% cellulose fibres, wherein the layer is built-up from a fibre structure only containing fibres from cellulosic structures. The layer of cellulose fibre web structure is in this embodiment thus free from thermoplastic fibres or other fibres that may negatively impact the formation of hydrogen bonds between the cellulose fibres during forming of the cellulose products. As described above, other substances may be added for changing the properties of the layer, such as suitable additives and water. With cellulose fibres is meant any type of cellulose fibres, such as natural cellulose fibres or manufactured cellulose fibres.

The second layer 4 may be formed in different ways. As one example, the second layer 4 is formed from woven cellulose fibres into the cellulose fibre web structure. A woven structure may for example be used to give specific strength properties to the cellulose product 1. Examples of woven cellulose fibres are fabrics made of viscose, rayon, hemp or cotton, or fabrics made of a mix of different cellulose fibres. Alternatively, the second layer 4 is formed from dry-formed cellulose fibres into the cellulose fibre web structure, or from wet-formed cellulose fibres into the cellulose fibre web structure, where traditional dry-forming or wet-forming techniques are used. Examples of wet-formed cellulose fibre structures are tissue structures, such as tissue paper structures, creped tissue structures and other paper structures.

The second layer 4 of cellulose fibre web structure may comprise one or more additives that are altering the mechanical, hydrophobic, and/or oleophobic properties of the cellulose product 1. Tests have shown that if the second layer 4 contains at least 70% of cellulose fibres desired mechanical properties of the cellulose product 1 can be achieved. In order to achieve the desired properties of the formed cellulose product 1, the cellulose fibres should be strongly bonded to each other through fibril aggregation in a way so that the resulting cellulose product 1 will have good mechanical properties. The additives used may therefore not impact the bonding of the cellulose fibres during the forming process to a high extent. As one example, thermoplastic fibres may not be added to the second layer 4, since they could melt and impact the bonding between the cellulose fibres.

According to one embodiment, the second layer 4 may have a material composition of 70-99.9% dry wt cellulose fibres and 0.1-30% dry wt of the one or more additives. In another embodiment, the second layer 4 may have a material composition of 80-99.9% dry wt cellulose fibres and 0.1-20% dry wt of the one or more additives. In a further embodiment, the second layer 4 may have a material composition of 90-99.9% dry wt cellulose fibres and 0.1-10% dry wt of the one or more additives. Depending on the amount of cellulose fibres and additives used in the second layer 4, the cellulose product 1 can have different properties.

The one or more additives of the second layer 4 can for example be starch compounds, rosin compounds, butanetetracarboxylic acid, gelatin compounds, alkyl ketene dimer (AKD), Alkenyl Succinic Anhydride (ASA), wax compounds, silicon compounds, calcium compounds, and/or fluorocarbons. These additives are commonly used in the forming of cellulose products and are therefore not described in detail. Starch compounds, gelatin compounds, butanetetracarboxylic acid, calcium compounds, and fluorocarbons may for example be used for altering the mechanical properties, such as strength or stiffness, of the cellulose product. Rosin compounds, alkyl ketene dimer (AKD), Alkenyl Succinic Anhydride (ASA), wax compounds, silicon compounds, and fluorocarbons may for example be used for altering the hydrophobic properties of the cellulose product. Fluorocarbons may for example be used also for altering the oleophobic properties of the cellulose product. The one or more additives of the second layer 4 may be added to the second layer 4 before forming the multi-layer cellulose blank structure 2, for example when forming the second layer 4.

Depending on the desired properties of the cellulose product 1, the compositions of the first layer 3 and the second layer 4 can be varied. By configuring the first layer 3 and the second layer 4 with either the same or different compositions, the resulting properties of the cellulose product 1 can be varied and controlled in an efficient way. Parameters that can vary in the first layer 3 and the second layer 4 may for example be the types of cellulose fibres used, the additives that are added to the respective layers and the amount of fibres or additives used in the respective layers. The layers may have different basis weights, densities, thicknesses or fibre compositions to control the properties of the cellulose product 1.

By using at least two layers when forming the multi-layer cellulose blank structure, the properties of the resulting cellulose product can be steered and controlled in a more efficient way compared to using only one layer. Through this method, cellulose products with desired mechanical properties can be achieved in an efficient way. The multi-layer cellulose blank structure can in this way for example enable different properties in the surface on one side of the cellulose product compared to the properties in the surface on the other side of or in the core of the cellulose product, depending on the number of layers used in the multi-layer cellulose blank structure.

The second layer 4 may be arranged as a carrying layer for the first layer 3, where the second layer 4 has a higher tensile strength than the first layer 3. This may be useful when the first layer 3 has a composition with a low tensile strength in order to avoid that the first layer will break during the forming of the cellulose product 1. The carrying layer with a higher tensile strength acts in this way as a supporting structure for the other layer. Also the basis weight of the different layers may be altered.

As an example, the first layer 3 may have a dry basis weight in the range of 50-2000 g/m$^2$ and a tensile strength in the range of 0.01-0.5 MPa before forming the multi-layer cellulose blank structure 2 in the forming mould 5 into the cellulose product 1. The second layer 4 may have a dry basis weight in the range of 10-30 g/m$^2$ and a tensile strength in the range of 0.5-4 MPa before forming the multi-layer cellulose blank structure 2 in the forming mould 5 into the cellulose product 1.

The multi-layer cellulose blank structure may further comprise one or more additional layers of cellulose fibres, and the multi-layer cellulose blank structure is formed through arranging the first layer, the second layer and the one or more additional layers of cellulose fibres in a superimposed relationship to each other and in the superimposed relationship arranging the different layers in contact with each other. The one or more additional layers of cellulose may for example be formed from a woven cellulose fibre structure, a dry-formed cellulose fibre structure, and/or a wet-formed cellulose fibre structure. Further, the one or more additional layers of cellulose fibres may contain additives or other components that are altering the properties of the cellulose product. By having more than only two layers when forming the multi-layer cellulose blank structure, the properties of the cellulose product can be further varied and controlled in an efficient way, in a similar way as described in relation to the first layer and the second layer above.

It would be possible according to the disclosure to blend cellulose fibres with a smaller amount of thermoplastic fibres in one or more of the additional layers. This mix of cellulose fibres with thermoplastic fibres may be used to even further vary or alter the properties of the cellulose product. For example, the surface properties or the core properties of the resulting composite structure having the single-layer configuration forming the cellulose product can be controlled and varied depending on how the at least one additional layer containing thermoplastic fibres is positioned in relation to the first layer, the second layer and possible other additional layer or layers. The thermoplastic fibres used may be any type of suitable conventional thermoplastic fibres.

As an example, the at least one of the one or more additional layers of the multi-layer cellulose blank structure may comprise 2-5% dry wt of thermoplastic reinforcing mono-component fibres having a melting temperature below the forming temperature. As an alternative, the at least one of the one or more additional layers of the multi-layer cellulose blank structure may instead comprise 2-5% dry wt of thermoplastic reinforcing bi-component fibres. The thermoplastic reinforcing bi-component fibres used may have an outer sheath and an inner core, where the melting temperature of the outer sheath is below the forming temperature, and the melting temperature of the inner core is above the forming temperature. With such a configuration of the bi-component fibres, a stiff structure can be achieved since the inner core is not melting during the forming process. The outer sheath is melting so that the bi-component fibres are attached to surrounding cellulose fibres. It would also be possible to mix mono-component fibres with bi-component fibres in the at least one of the one or more additional layers.

As described above, additives may be added to any of the layers forming the multi-layer cellulose blank structure 2. As an alternative, one or more additives that are altering the mechanical, hydrophobic, and/or oleophobic properties of the cellulose product 1 may instead be added to the formed multi-layer cellulose blank structure 2. This can be done during the forming of the multi-layer cellulose blank structure 2 from the different layers or after the forming of the multi-layer cellulose blank structure 2. Tests have shown that if the multi-layer cellulose blank structure 2 contains at least 70% of cellulose fibres desired mechanical properties of the cellulose product 1 can be achieved. In order to achieve the desired properties of the formed cellulose product 1, the cellulose fibres should be strongly bonded to each other through fibril aggregation in a way so that the resulting cellulose product 1 will have good mechanical properties. The additives used may therefore not impact the bonding of the cellulose fibres during the forming process to a high extent. Another aspect is the recycling or composting of the cellulose product, and the additives may therefore be chosen so that the recycling or composting of the cellulose product is not impacted by the additives to a high degree.

According to one embodiment, the multi-layer cellulose blank structure 2 may comprise 70-99.9% dry wt cellulose fibres and 0.1-30% dry wt of the one or more additives. In another embodiment, the multi-layer cellulose blank structure 2 may comprise 80-99.9% dry wt cellulose fibres and 0.1-20% dry wt of the one or more additives. In a further embodiment, the multi-layer cellulose blank structure 2 may comprise 90-99.9% dry wt cellulose fibres and 0.1-10% dry wt of the one or more additives. Depending on the amount of cellulose fibres and additives used in the multi-layer cellulose blank structure 2, the cellulose product 1 can have different properties.

The one or more additives of the multi-layer cellulose blank structure 2 can for example be starch compounds, rosin compounds, butanetetracarboxylic acid, gelatin compounds, alkyl ketene dimer (AKD), Alkenyl Succinic Anhydride (ASA), wax compounds, silicon compounds, calcium compounds, and/or fluorocarbons. These additives are commonly used in the forming of cellulose products and are therefore not described in detail. Starch compounds, gelatin compounds, butanetetracarboxylic acid, calcium compounds, and fluorocarbons may for example be used for altering the mechanical properties, such as strength or stiffness, of the cellulose product. Rosin compounds, alkyl ketene dimer (AKD), Alkenyl Succinic Anhydride (ASA), wax compounds, silicon compounds, and fluorocarbons may for example be used for altering the hydrophobic properties of the cellulose product. Fluorocarbons may for example be used also for altering the oleophobic properties of the cellulose product.

In order to achieve an attractive appearance of the cellulose product at least one of the first layer, the second layer, or the one or more additional layers of the multi-layer cellulose blank structure may be a pre-printed or coloured layer. The layer or layers may be coloured through any suitable conventional colouring method. Graphical figures or patterns may be printed on the layer or layers so that the cellulose product will have an aesthetically appealing design. The coloured or pre-printed layer can also be used for branding and/or content descriptions, eliminating the need for additional labels. The cellulose product can for example be coloured by using a pre-coloured tissue as an outer layer. A printed or coloured layer may be used for decorating one of the sides or both sides of the cellulose products and by using pre-printed or pre-coloured layers, aesthetically attractive products may be produced without the need for printing or colouring the products after the forming step in the forming mould. The use of pre-printed or pre-coloured layers is both time saving and cost efficient compared to traditional forming of coloured or printed wet moulded cellulose products.

Figure 2:
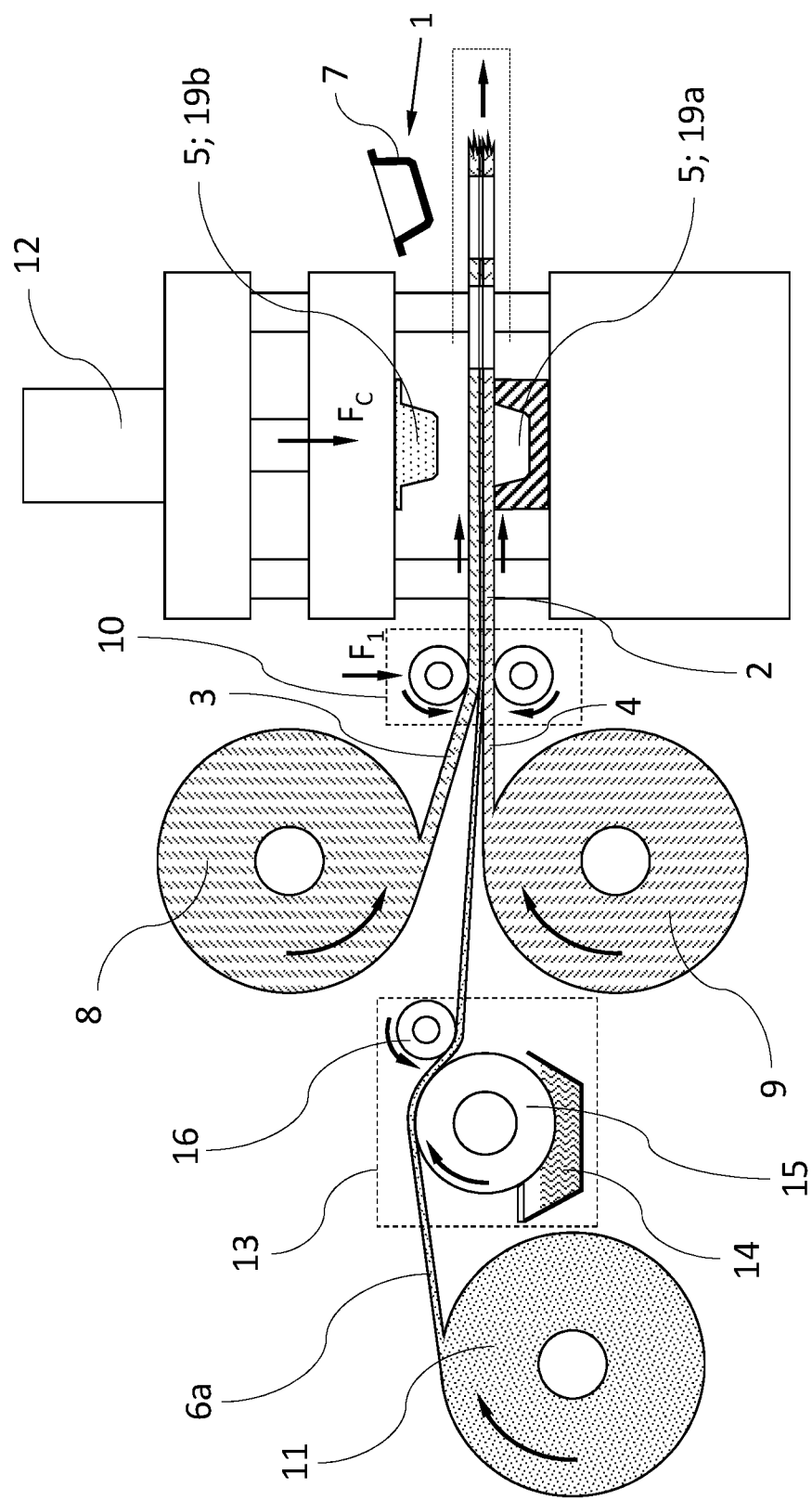
FIG. 2 shows schematically, a method for producing a cellulose product from a multi-layer cellulose blank structure in a three-layer configuration according to the disclosure.

FIG. 2 schematically shows another embodiment for producing the cellulose product 1 from a multi-layer cellulose blank structure 2, where the multi-layer cellulose blank structure 2 has a three-layer configuration. In the embodiment shown in FIG. 2, the multi-layer cellulose blank structure 2 is formed from a first layer 3 of dry-formed cellulose fibres, a second layer 4 of a cellulose fibre web structure and an additional layer 6a of cellulose fibres 6a.

In the embodiment shown in FIG. 2, the first layer 3, the second layer 4, and the additional layer 6a are arranged in prefabricated web structures wound in rolls. The first layer 3 of the dry-formed cellulose fibres is wound in a first roll 8, the second layer 4 of the cellulose fibre web structure is wound in a second roll 9, and the additional layer 6a is wound in a third roll 11. The first layer 3, the second layer 4, and the additional layer 6a are in the method unwound from the respective rolls 8, 9, 11 and arranged in the superimposed relationship to each other. As shown in FIG. 2, also in this embodiment, a pair of pressure feed rollers 10 may be used for both unwinding the first layer 3, the second layer 4, and the additional layer 6a, and for arranging the layers 3, 4, 6a in contact with each other. In this embodiment the first layer 3 is arranged above the additional layer 6a, and the additional layer 6a is arranged above the second layer 4, but the layers may be arranged in any desired order in relation to each other. The pair of pressure feed rollers 10 may be arranged so that the rolls are pushed against each other with a force $F_1$, and when the layers are passing between the pair of pressure feed rollers 10, the layers are compacted and forming the multi-layer blank structure 2. The force $F_1$ may be chosen so that a desired compacting of the layers is achieved. Other suitable means may be used instead of the pair of pressure feed rollers 10, such as for example motorized unwinders for the web rolls. The force $F_1$ of the pair of pressure feed rollers 10 may be in the range 2000 N to 17000 N, and the multi-layer cellulose blank structure may have a width of 0.35 m. The pair of pressure feed rollers 10 may be heated, for example to a temperature in the range of 70° C. to 170° C. Further according to the method, the multi-layer cellulose blank structure 2 may be transported, arranged and formed through heating and pressing in the forming mould 5 in the same ways and with the alternatives described in relation to the embodiments above. The forming mould unit 12 and the forming mould 5 may have any suitable configuration, as described above.

As shown in FIG. 2, an additive applying unit 13 may be arranged in relation to the additional layer 6a for applying additive to the web structure unwound from the third roll 11. The additive applying unit 13 may comprise a pair of rollers and a tray 14 or similar structure for holding the additive. An application roller 15 is arranged so that the additive from the tray 14 is applied onto the additional layer 6a when being unwound from the third roll 11, where the application roller 15 is transferring the additive from the tray 14 to the additional layer 6a. A pressure roller 16 is used for applying pressure to the additional layer 6a so that the additive is efficiently distributed within the web structure. With this type of additive application unit 13, the additive may be in a solvent or in powder form.

Similar application structures may be used for transferring additives to the first layer 3 and/or the second layer 4 if desired in any of the embodiments described. Other types of additive applying units may also be used.

The multi-layer cellulose blank structure 2 is also in this embodiment heated to a forming temperature in the range of 100° C. to 300° C. The multi-layer cellulose blank structure 2 is formed in the forming mould by pressing the heated multi-layer cellulose blank structure 2 with an isostatic forming pressure of at least 1 MPa, preferably 4-20 MPa. By heating the multi-layer cellulose blank structure 2 and pressing the multi-layer cellulose blank structure 2 in the forming mould, the cellulose product 1 is formed, where the formed cellulose product is shaped into a two-dimensional or three-dimensional fibre composite structure 7 having a single-layer configuration. Also in this embodiment, pressure levels in the range of 4-20 MPa and temperature levels in the range of 140° C. to 200° C. are often sufficient in order to achieve cellulose products with desired properties.

In the embodiment shown in FIG. 2, the multi-layer cellulose blank structure 2 is heated and formed into the cellulose product 1, where the cellulose product 1 may have any desired two-dimensional or three-dimensional shape. The first layer 3, the second layer 4 and the additional layer 6a are unwound from the respective rolls 8, 9, 11, and compressed by the pair of pressure feed rollers 10. When the first layer 3, the second layer 4, and the additional layer 6a are arranged in a superimposed relationship to each other and arranged in contact with each other, the multi-layer cellulose blank structure 2 is formed. The multi-layer cellulose blank structure 2 is in the forming mould 5 formed into the cellulose product 1, which is shaped into a two-dimensional or three-dimensional fibre composite structure 7 having a single-layer configuration. In the embodiment shown in FIG. 2, the multi-layer cellulose blank structure 2 has a three-layer configuration formed of the first layer 3, the second layer 4, and the additional layer 6a. The pair of pressure feed rollers 10 is transporting the multi-layer cellulose blank structure 2 to the forming mould 5. The heating of the multi-layer cellulose blank structure 2 may take place before arranging the multi-layer cellulose blank structure 2 in the forming mould 5 or at least partly before the pressing in the forming mould 5. As an alternative, the heating of the multi-layer cellulose blank structure 2 may take place in the forming mould 5 when being pressed. The pressure may also be applied before heating the multi-layer cellulose blank structure 2, and for example the heating of the multi-layer cellulose blank structure 2 may take place in the forming mould 5 during pressing.

The cellulose product 1 may be formed in the forming mould 5 during a forming time period in the range of 0.001 to 20 seconds. As an alternative, the forming time period may be 0.01 to 15.0 seconds or 0.1 to 10.0 seconds. The time period is chosen so that the desired properties of the cellulose products are achieved and longer forming time periods can be needed if the multi-layer cellulose blank structure 2 is heated in the forming mould 5. During the development of a new cellulose product, it might be necessary to manufacture prototypes with different forming time periods in order to establish which forming time period is the most suitable.

Figure 3:
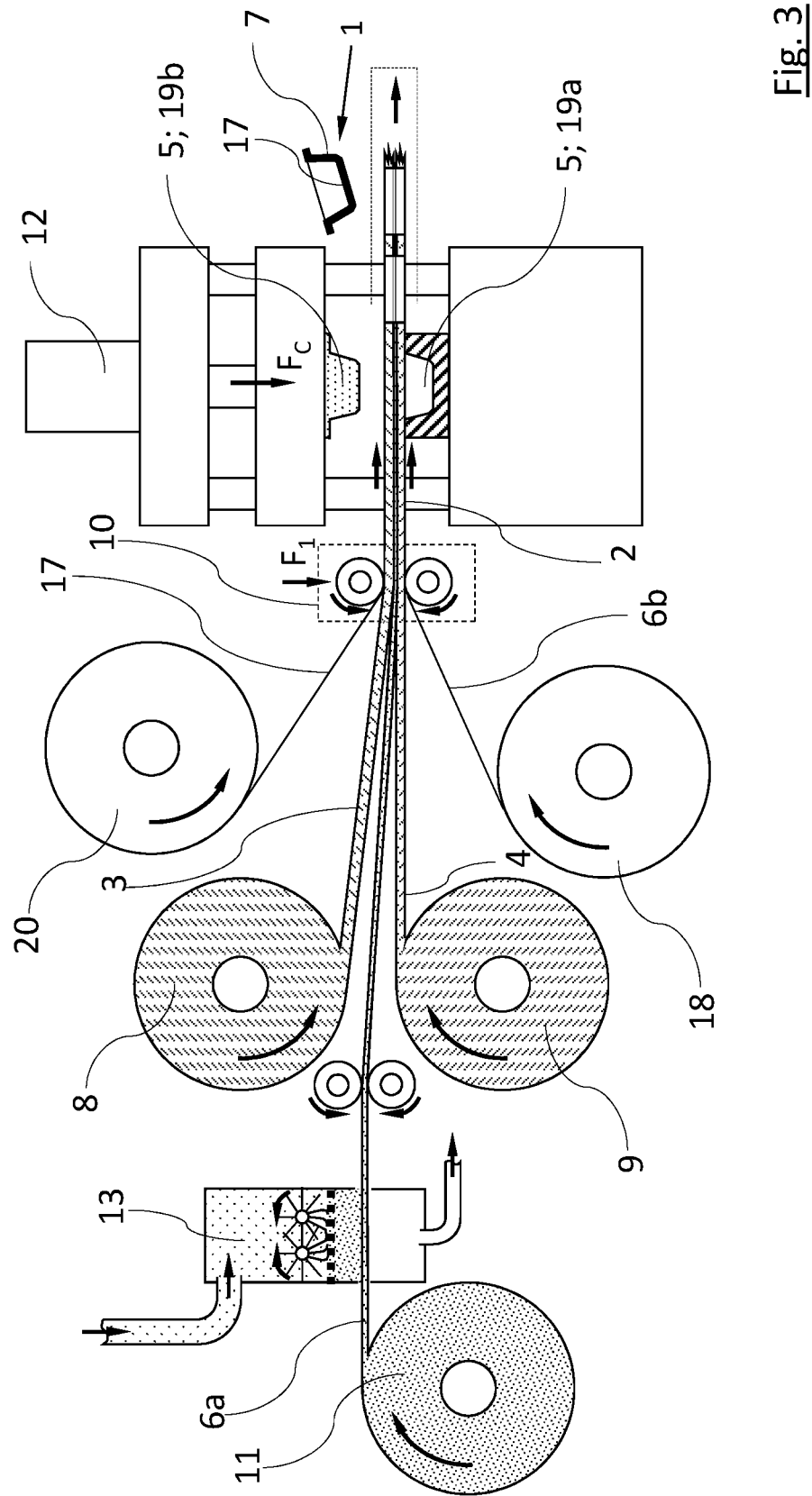
FIG. 3 shows schematically, a method for producing a cellulose product from a multi-layer cellulose blank structure in a four-layer configuration according to the disclosure.

FIG. 3 schematically shows a further embodiment for producing the cellulose product 1 from a multi-layer cellulose blank structure 2, where the multi-layer cellulose blank structure 2 has a four-layer configuration. In the embodiment shown in FIG. 3, the multi-layer cellulose blank structure 2 is formed from a first layer 3 of dry-formed cellulose fibres, a second layer 4 of a cellulose fibre web structure, a first additional layer 6a of cellulose fibres, and a second 6b additional layer of cellulose fibres. The second additional layer 6b may for example be arranged as a pre-printed or coloured layer as described above. As shown in FIG. 3, a fifth barrier layer 17 is arranged in contact with the multi-layer cellulose blank structure 2 having a four-layer configuration. The barrier layer 17 may for example be made of a suitable polymer film or similar structure that is acting as a barrier for liquids and/or gases and that is adhering to the multi-layer cellulose blank structure 2 to a certain extent during the forming of the cellulose product 1 in the forming mould 5. The barrier layer 17 may be, as a non-limiting example, made of polyethylene (PE), polyamide (PA), polypropylene (PP), polylactic acid (PLA), or coated aluminium. As an alternative, the barrier layer 17 may be made of a suitable biodegradable material, such as for example starch based films or films from other biodegradable materials. The barrier layer 17 may be made of a combination of different materials such as for example laminated, coated or sputtered barrier structures, where individual layers may be nanostructures. The barrier layer is suitably at least partly compostable or biodegradable, or has as an alternative low or neglectable environmental impact.

Figure 5:
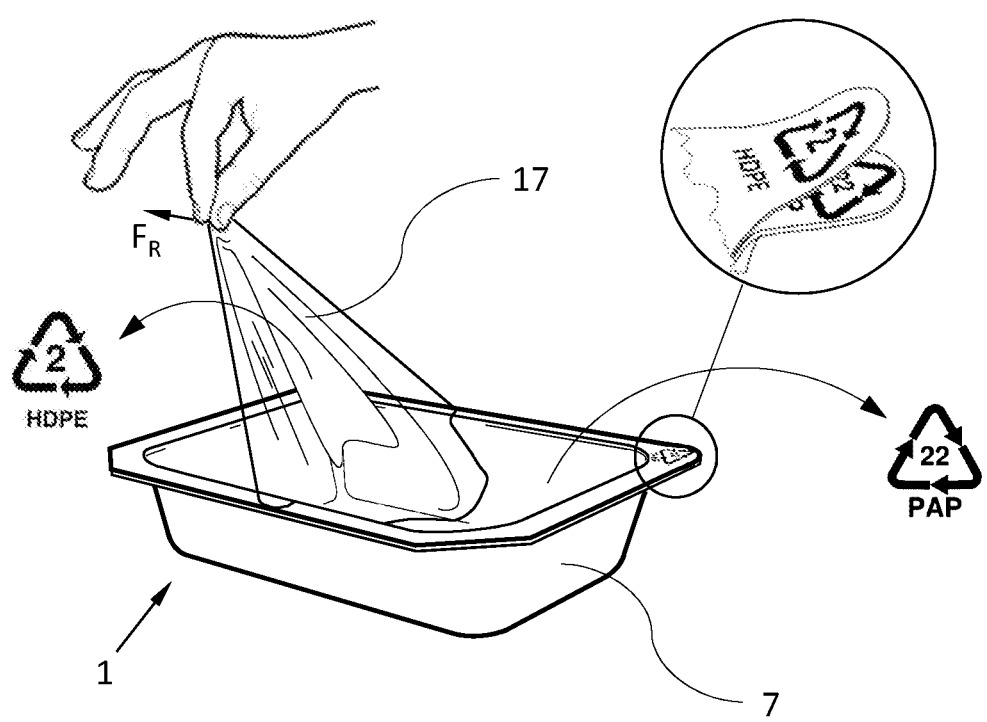
FIG. 5 shows schematically, a cellulose product with a removable barrier layer according to the disclosure.

In order to increase the possibility to recycle the cellulose product 1 the barrier layer 17 may be configured so that, after the forming in the forming mould 5, it is possible to remove the barrier layer 17 from the fibre composite structure 7 in a simple way after use of the cellulose product 1. In FIG. 5, a cellulose product with a removable barrier layer 17 according to the disclosure is schematically shown. In this embodiment the fibre composite structure 7 comprises recyclable cellulose fibres and the barrier layer comprises a recyclable film of high-density polyethylene (HDPE). The barrier layer 17 can be separated from the fibre composite structure by peeling off the barrier layer 17 from the fibre composite structure 7 with a removal force FR, as illustrated in FIG. 5. After the removal of the barrier layer 17 from the fibre composite structure 7, the fibre composite structure 7 can be recycled as a paper product (PAP) or composted, and the barrier layer 17 of HDPE can be recycled as a plastic material.

In the embodiment shown in FIG. 3, the first layer 3, the second layer 4, the first additional layer 6a, and second additional layer 6b are arranged in prefabricated web structures wound in rolls. The first layer 3 of the dry-formed cellulose fibres is wound in a first roll 8, the second layer 4 of the cellulose fibre web structure is wound in a second roll 9, the first additional layer 6a is wound in a third roll 11, and the second additional layer 6b is wound in a fourth roll 18. The first layer 3, the second layer 4, the first additional layer 6a, and the second additional layer 6b are in the method unwound from the respective rolls 8, 9, 11, 18 and arranged in the superimposed relationship to each other. As shown in FIG. 3, also in this embodiment, a pair of pressure feed rollers 10 may be used for both unwinding the first layer 3, the second layer 4, and the additional layers 6a, 6b, and for arranging the layers 3, 4, 6a, 6b in contact with each other.

It is also possible to have more than one pair of pressure feed rollers for compacting the layers. In this embodiment the first layer 3 is arranged above the first additional layer 6a, the first additional layer 6a is arranged above the second layer 4, and the second additional layer 6b is arranged below the second layer 4, but the layers may be arranged in any desired order in relation to each other. As shown in FIG. 3, the barrier layer 17 is wound in a fifth roll 20 and arranged above the first layer 3. The barrier layer 17 is in the method unwound from the fifth roll 20 and arranged in superimposed relationship to the other layers forming the multi-layer cellulose blank structure. The pair of pressure feed rollers 10 may be used also for unwinding the barrier layer 17 and for arranging the barrier layer in contact with the other layers 3, 4, 6a, 6b. The pair of pressure feed rollers 10 may be arranged so that the rolls are pushed against each other with a force $F_1$, and when the layers are passing between the pair of pressure feed rollers 10, the layers are compacted and forming the multi-layer blank structure 2 with the barrier layer 17 in contact with the multi-layer cellulose blank structure 2. The force $F_1$ may be chosen so that a desired compacting of the layers is achieved.

Other suitable means may be used instead of the pair of pressure feed rollers 10, such as for example motorized unwinders for the web rolls. The force $F_1$ of the pair of pressure feed rollers may be in the range 2000 N to 17000 N, and the multi-layer cellulose blank structure may have a width of 0.35 m. The pair of pressure feed rollers 10 may be heated, for example to a temperature in the range of 70° C. to 170° C.

Further according to the method, the multi-layer cellulose blank structure 2 may be transported, arranged and formed through heating and pressing in the forming mould 5 in the same ways and with the alternatives described in relation to the embodiments above. The forming mould unit 12 and the forming mould 5 may have any suitable configuration, as described above.

As shown in FIG. 3, an additive applying unit 13 may be arranged in relation to the first additional layer 6a for applying additive to the web structure unwound from the third roll 11. The additive applying unit 13 may comprise a sprinkling or spraying unit that is distributing the additive on top of the layer. The additive may for example be in powder form or in a solvent. A pair of rollers may be arranged after the additive applying unit 13 if needed. Similar application structures may be used for transferring additives to the first layer 3, the second layer 4, and/or the second additional layer 6b.

The multi-layer cellulose blank structure 2 together with the barrier layer 17 is also in this embodiment heated to a forming temperature in the range of 100° C. to 300° C. The multi-layer cellulose blank structure 2 and the barrier layer 17 are formed in the forming mould by pressing the heated multi-layer cellulose blank structure 2 and the barrier layer 17 with an isostatic forming pressure of at least 1 MPa, preferably 4-20 MPa. By heating the multi-layer cellulose blank structure 2 and the barrier layer 17, and pressing the multi-layer cellulose blank structure 2 and the barrier layer 17 in the forming mould, the cellulose product 1 is formed. During the forming, the multi-layer cellulose blank structure 2 is shaped into a two-dimensional or three-dimensional fibre composite structure 7 having a single-layer configuration, and the barrier layer 17 is adhered to the two-dimensional or three-dimensional fibre composite structure 7. Also in this embodiment, pressure levels in the range of 4-20 MPa and temperature levels in the range of 140° C. to 200° C. are often sufficient in order to achieve cellulose products with desired properties.

In the embodiment shown in FIG. 3, the multi-layer cellulose blank structure 2 is heated and formed into the cellulose product 1, where the cellulose product 1 may have any desired two-dimensional or three-dimensional shape. The first layer 3, the second layer 4 and the additional layers are unwound from the respective rolls 8, 9, 11, 18 and compressed by the pair of pressure feed rollers 10. When the first layer 3, the second layer 4, the first additional layer 6a, and the second additional layer 6b are arranged in a superimposed relationship to each other and arranged in contact with each other, the multi-layer cellulose blank structure 2 is formed. The multi-layer cellulose blank structure 2 is in the forming mould 5 formed into the cellulose product 1, which is shaped into a two-dimensional or three-dimensional fibre composite structure 7 having a single-layer configuration. In the embodiment shown in FIG. 2, the multi-layer cellulose blank structure 2 has a four-layer configuration formed of the first layer 3, the second layer 4, the first additional layer 6a, and the second additional layer 6b. The pair of pressure feed rollers 10 is transporting the multi-layer cellulose blank structure 2 to the forming mould 5. The heating of the multi-layer cellulose blank structure 2 may take place before arranging the multi-layer cellulose blank structure 2 in the forming mould 5 or at least partly before the pressing in the forming mould 5. As an alternative, the heating of the multi-layer cellulose blank structure 2 may take place in the forming mould 5 when being pressed. The pressure may also be applied before heating the multi-layer cellulose blank structure 2, and for example the heating of the multi-layer cellulose blank structure 2 may take place in the forming mould 5 during pressing.

The cellulose product 1 may be formed in the forming mould 5 during a forming time period in the range of 0.001 to 20 seconds. As an alternative, the forming time period may be 0.01 to 15.0 seconds or 0.1 to 10.0 seconds. The time period is chosen so that the desired properties of the cellulose products are achieved and longer forming time periods can be needed if the multi-layer cellulose blank structure 2 is heated in the forming mould 5. During the development of a new cellulose product, it might be necessary to manufacture prototypes with different forming time periods in order to establish which forming time period is the most suitable.

In FIG. 6, an example of a cellulose product P formed of three different layers is schematically shown. The product P comprises a first layer 3 of dry-formed cellulose fibres, a second layer 4 of a cellulose fibre web structure, and an additional layer 6a. The layers may have compositions described in the different embodiments above. The first layer 3 is arranged as a middle layer between the additional layer 6a and the second layer 4. The additional layer 6a is arranged as an upper layer, and may comprise additives providing non-absorbing properties. Suitable additives for the additional layer 6a may for example be wax compositions, silicone compositions or other compositions preventing liquid absorption. The additional layer 6a is provided with one or more openings 22 allowing liquid L to flow from an upper side 23a of the cellulose product P through the additional layer 6a into the first layer 3. The second layer 4 is arranged as a lower layer and may comprise additives providing non-absorbing properties. Suitable additives for the second layer 4 may for example be wax compositions, silicone compositions or other compositions preventing liquid absorption. The first layer 3 is in this embodiment arranged as an absorption layer for liquid flow through the openings 22 of the additional layer 6a, and the second layer 4 is arranged as a liquid barrier preventing the liquid L from flowing through the lower side 23b of the cellulose product P. The second layer 4 is further arranged to provide a rigid structure. If desired, the cellulose product P may include one or more further additional layers for absorbing the liquid L, for preventing liquid flow, for stabilizing the construction, and/or for providing an aesthetically appealing appearance through for example a coloured or patterned additional layer. A cellulose product P of this type may be used as containers for food 24 allowing liquid L from the food to be absorbed in the first layer 3. A specific use may be meat trays for meat or minced meat, where meat juice is allowed to flow through the additional layer 6a into the first layer 3. The cellulose product P may if desired be wrapped in a gas barrier structure. In an alternative embodiment, not shown in the figures, the product P comprises a first layer 3 of dry-formed cellulose fibres, a second layer 4 of a cellulose fibre web structure, and a barrier layer 17. The layers may have compositions described in the different embodiments above. The first layer 3 is arranged as a middle absorption layer between the second layer 4 and the barrier layer 17. The second layer 4 may be arranged as an upper layer, and may comprise additives providing non-absorbing properties and provided with openings 22 for liquid flow. The barrier layer 17 may be used as a non-absorbing liquid barrier structure.

It should be understood that any number of layers may be used to form the cellulose product. Also more than one barrier layer may be used in the cellulose product. The second layer and/or one or more of the additional layers may be arranged as carrying layer or layers for other layers in the multi-layer cellulose blank structure.

Other additives, that may be suitable for products coming into contact with food, used in the different layers or in the multi-layer cellulose blank structure are for example; carbonate salts; polysaccharides; minerals, such as silica; paraffins, such as microcrystalline waxes, low-molecular polyolefins and polyterpenes; polyvinyl alcohol; silicone oils resins or elastomers; chromium chloride complexes; aluminium, calcium, sodium, potassium, and ammonium salts; casein; mannogalactanes; sodium salt of carboxymethyl cellulose; methyl cellulose; hydroxyethyl cellulose; alginates; xanthane; copolymer structures; basic potassium zirconium carbonate; imidazolium compounds; phosphoric acid ester of ethoxylated perfluoropolyetherdiol; modified polyethylene terephthalates, perfluoropolyetherdicarbonic acid; poly hexafluoropropylene oxide.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Cellulose product
2: Multi-layer cellulose blank structure
3: First layer
4: Second layer
5: Forming mould
6: Additional layer
7: Fibre composite structure
8: First roll
9: Second roll
10: Pair of pressure feed rollers
11: Third roll
12: Forming mould unit
13: Additive applying unit
14: Tray
15: Application roller
16: Pressure roller
17: Barrier layer
18: Fourth roll
19a: Lower mould part
19b: Upper mould part
20: Fifth roll
21: Deformation element
22: Opening
23a: Upper side
23b: Lower side
24: Food

The invention claimed is:

1. A method for producing a cellulose product from a multi-layer cellulose blank structure, wherein the method comprises the steps;
   forming the multi-layer cellulose blank structure from at least a first layer of dry-formed cellulose fibres and a second layer of a cellulose fibre web structure, through arranging the at least first layer and second layer in a superimposed relationship to each other and in the superimposed relationship arranging the at least first layer and second layer in contact with each other;
   arranging the multi-layer cellulose blank structure in a forming mould; and
   heating the multi-layer cellulose blank structure to a forming temperature in the range of 100° C. to 300° C.,
   characterized in that the first and second layers have a fiber composition of 100% cellulose fibers and are free from thermoplastic fibers, and that the method further comprises the step;
   forming the cellulose product from the multi-layer cellulose blank structure in the forming mould, by pressing the heated multi-layer cellulose blank structure with an isostatic forming pressure of at least 4 MPa, wherein the multi-layer cellulose blank structure is shaped into a three-dimensional fibre composite structure having a single-layer configuration, wherein the first layer of dry-formed cellulose fibres and/or the second layer comprises one or more additives that are altering the mechanical, hydrophobic, and/or oleophobic properties of the cellulose product, or that one or more additives that are altering the mechanical, hydrophobic, and/or oleophobic properties of the cellulose product are added to the formed multi-layer cellulose blank structure, wherein the first layer and/or the second layer and/or the multilayer cellulose blank structure has a material composition of 70-99.9% dry wt cellulose fibres and 0.1-30% dry wt of the one or more additives, wherein the one or more additives of the first layer are starch compounds, rosin compounds, butanetetracarboxylic acid, gelatin compounds, alkyl ketene dimer (AKD), Alkenyl Succinic Anhydride (ASA), wax compounds, silicon compounds, calcium compounds, and/or fluorocarbons.

2. A method according to claim 1,
characterized in that the first layer of dry-formed cellulose fibres is formed in a dry-forming process where the cellulose fibres are carried and formed into the first layer by air as carrying medium.

3. A method according to claim 1,
characterized in that the cellulose product is formed in the forming mould during a forming time period in the range of 0.001 to 20 seconds.

4. A method according to claim 1,
characterized in that the one or more additives of the first layer have been added to the first layer before forming the multi-layer cellulose blank structure.

5. A method according to claim 1,
characterized in that the second layer is formed from dry-formed cellulose fibres into the cellulose fibre web structure, from woven cellulose fibres into the cellulose fibre web structure, or from wet-formed cellulose fibres into the cellulose fibre web structure.

6. A method according to claim 1,
characterized in that the second layer comprises one or more additives that are altering the mechanical, hydrophobic, and/or oleophobic properties of the cellulose product, wherein the second layer has a material composition of 70-99.9% dry wt cellulose fibres and 0.1-30% dry wt of the one or more additives.

7. A method according to claim 6,
characterized in that the second layer is arranged as a carrying layer for the first layer, wherein the second layer has a higher tensile strength than the first layer.

8. A method according to claim 7,
characterized in that the first layer has a dry basis weight in the range of 50-2000 g/m2 and a tensile strength in the range of 0.01-0.5 MPa before forming the multi-layer cellulose blank structure in the forming mould into the cellulose product, and
the second layer has a dry basis weight in the range of 10-30 g/m2 and a tensile strength in the range of 0.5-4 MPa before forming the multi-layer cellulose blank structure in the forming mould into the cellulose product.

9. A method according to claim 1,
characterized in that the multi-layer cellulose blank structure further comprises one or more additional layers (6a, 6b, . . . , 6n) of cellulose fibres, wherein the multi-layer cellulose blank structure is formed through arranging the layers (3, 4, 6a, 6b, . . . , 6n) of cellulose fibres in a superimposed relationship to each other and in the superimposed relationship arranging the layers (3, 4, 6a, 6b, . . . , 6n) of cellulose fibres in contact with each other.

10. A method according to claim 6,
characterized in that one or more additives that are altering the mechanical, hydrophobic, and/or oleophobic properties of the cellulose product are added to the formed multi-layer cellulose blank structure, wherein the formed multi-layer cellulose blank structure comprises 70-99.9% dry wt cellulose fibres and 0.1-30% dry wt of the one or more additives.

11. A method according to claim 1,
characterized in that the multi-layer cellulose blank structure is heated in the forming mould.

12. A method according to claim 9,
characterized in that the multi-layer cellulose blank structure is arranged as a layered continuous web comprising the layers (3, 4, 6a, 6b, ..., 6n) of cellulose fibres.

13. A method according to claim 9,
characterized in that the multi-layer cellulose blank structure is arranged as discrete pieces of material comprising the layers (3, 4, 6a, 6b, ..., 6n) of cellulose fibres.

14. A method according to claim 1,
characterized in that the method further comprises the steps;
arranging a barrier layer in contact with the multi-layer cellulose blank structure, and
forming the multi-layer cellulose blank structure and the barrier layer in the forming mould, wherein during forming the barrier layer is adhered to the two-dimensional or three-dimensional fibre composite structure.

15. A method according to claim 14,
characterized in that the barrier layer is a polyethylene (PE) film, polyamide (PA) film, polypropylene (PP) film, polylactic acid (PLA) film, coated aluminium structure, cellulose structure laminated with a thermoplastic material, cellulose structure coated with wax, or cellulose structure coated with silicon.

16. The method of claim 1 wherein the first layer and/or the second layer and/or the multilayer cellulose blank structure has a material composition of 80-99.9% dry wt cellulose fibres and 0.1-20% dry wt of the one or more additives.

17. The method of claim 1 wherein the first layer and/or the second layer and/or the multilayer cellulose blank structure has a material composition of 90-99.9% dry wt cellulose fibres and 0.1-10% dry wt of the one or more additives.

* * * * *

UNITED STATES PATENT AND TRADEMARK OFFICE
CERTIFICATE OF CORRECTION

PATENT NO. : 11,717,993 B2
APPLICATION NO. : 17/049842
DATED : August 8, 2023
INVENTOR(S) : Linus Larsson et al.

It is certified that error appears in the above-identified patent and that said Letters Patent is hereby corrected as shown below:

In the Claims

At Column 26, Line 41, "50-2000 g/m2" should be -- 50-2000 $g/m^2$ --.

At Column 26, Line 46, "10-30 g/m2" should be -- 10-30 $g/m^2$ --.

Signed and Sealed this
Seventh Day of May, 2024

Katherine Kelly Vidal
*Director of the United States Patent and Trademark Office*